(12) United States Patent
Greenhill-Hooper et al.

(10) Patent No.: US 10,351,764 B2
(45) Date of Patent: Jul. 16, 2019

(54) FOAM FORMING COMPOSITIONS COMPRISING A PARTICULATE INORGANIC MATERIAL

(71) Applicant: ImerTech SAS, Paris (FR)

(72) Inventors: Michael Greenhill-Hooper, Miradoux (FR); Gilles Collard, Tournefeuille (FR); Stephen Johan Neethling, Canterbury (GB); Pablo Rafael Brito Parada, London (GB)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/543,584

(22) PCT Filed: Jan. 15, 2016

(86) PCT No.: PCT/EP2016/050837
§ 371 (c)(1),
(2) Date: Jul. 14, 2017

(87) PCT Pub. No.: WO2016/113421
PCT Pub. Date: Jul. 21, 2016

(65) Prior Publication Data
US 2018/0010038 A1    Jan. 11, 2018

(30) Foreign Application Priority Data
Jan. 15, 2015 (EP) .................................. 15290008

(51) Int. Cl.
| | |
|---|---|
| *C09K 8/94* | (2006.01) |
| *C09K 8/38* | (2006.01) |
| *C09K 8/518* | (2006.01) |
| *C09K 8/70* | (2006.01) |
| *B01F 3/04* | (2006.01) |
| *C01F 5/00* | (2006.01) |
| *C03C 3/04* | (2006.01) |
| *C09K 8/05* | (2006.01) |
| *C09K 8/528* | (2006.01) |
| *C09K 8/60* | (2006.01) |

(52) U.S. Cl.
CPC ............ *C09K 8/94* (2013.01); *B01F 3/04446* (2013.01); *C01F 5/00* (2013.01); *C03C 3/04* (2013.01); *C09K 8/05* (2013.01); *C09K 8/38* (2013.01); *C09K 8/518* (2013.01); *C09K 8/528* (2013.01); *C09K 8/602* (2013.01); *C09K 8/703* (2013.01); *C09K 2208/06* (2013.01)

(58) Field of Classification Search
CPC .................................... C09K 8/04; C09K 8/94
USPC ......................................... 507/134, 140, 269
See application file for complete search history.

(56) References Cited

U.S. PATENT DOCUMENTS

| | | | | |
|---|---|---|---|---|
| 5,807,810 A | * | 9/1998 | Blezard ..................... | C09K 5/08 507/103 |
| 5,858,928 A | | 1/1999 | Aubert et al. | |
| 6,194,354 B1 | * | 2/2001 | Hatchman ........... | B01F 17/0085 507/131 |
| 2004/0005987 A1 | | 1/2004 | Ristol et al. | |
| 2004/0110643 A1 | | 6/2004 | Zevallos | |
| 2006/0019834 A1 | * | 1/2006 | Melbouci ................. | C09K 8/04 507/100 |
| 2009/0082230 A1 | * | 3/2009 | Javora ...................... | C09K 8/04 507/269 |
| 2011/0120719 A1 | * | 5/2011 | Soane ...................... | C09K 8/94 166/308.1 |
| 2013/0025869 A1 | * | 1/2013 | Harris ...................... | C09K 8/38 166/308.6 |
| 2016/0222284 A1 | * | 8/2016 | He ........................... | C09K 8/86 |
| 2017/0114265 A1 | * | 4/2017 | Ma .......................... | C09K 8/035 |

FOREIGN PATENT DOCUMENTS

| | | |
|---|---|---|
| WO | WO 92/10609 | 6/1992 |
| WO | WO 2004/025080 A2 | 3/2004 |

OTHER PUBLICATIONS

International Search Report and Written Opinion dated Jun. 14, 2016, in International Application No. PCT/EP2015/050837 (19 pgs.).

* cited by examiner

*Primary Examiner* — Ellen M McAvoy
(74) *Attorney, Agent, or Firm* — Finnegan, Henderson, Farabow, Garrett & Dunner LLP

(57) ABSTRACT

The present invention relates to aqueous compositions for forming a foam, comprising a surfactant and a particulate inorganic material, and optionally one or more polymers, such as soil conditioning polymers, and/or viscosity increasing polymers. The present invention further relates to the use and application of said aqueous compositions.

19 Claims, No Drawings

FOAM FORMING COMPOSITIONS COMPRISING A PARTICULATE INORGANIC MATERIAL

CLAIM FOR PRIORITY

This application is a U.S. national phase entry under 35 U.S.C. § 371 from PCT International Application No. PCT/EP2016/050837, filed Jan. 15, 2016, which claims the benefit of priority of EP Application No. 15290008.0, filed Jan. 15, 2015, both of which are incorporated herein by reference and to both of which this application claims priority.

FIELD OF THE INVENTION

The present invention relates to aqueous compositions for forming foams. The foams may be used in a variety of applications, such as for example in tunnel excavation (boring, drilling). The invention further relates to the use of particulate inorganic materials in the formation of foams, and methods for improving foam stability.

BACKGROUND OF THE INVENTION

Aqueous foams are employed during wide bore tunnel excavation through clayey soils using tunnel boring machines (TBMs). The foams are used as a means to add fluids to fill the drilling chamber to help maintain pressure without adding too much water. Further, they help prevent the clay from clogging up the cutter head of the machine and also the conveyor belts taking away the excavated spoil. The mechanism of how the foam works is not well understood but it appears that the foam prevents clay lumps from contacting one another, dilutes the day and prevents lumps from hydrating to the point at which the clay becomes sticky. It is also thought that the foam acts as a lubricant.

One problem with the surfactant-stabilised foams is that on contact with the clay, the surfactant and water associated with the foam are attracted to and adsorbed by the high surface area day and the result is a much shortened life for the foam due to collapsing. This leads to large amounts of foam being required in order to replace collapsed foam, causing problems with evacuation of liquids from the bore hole, the requirement for fast delivery of foam to the bore hole, and for supplying and maintaining large amounts of foam composition at the drilling site. Furthermore, after downtime of the tunnel boring machine, it is often found that the foam has broken down upon start-up of the TBM.

WO 01/12952 A1 discloses a foamed aqueous solution for use in tunnel excavation, containing an anionic surfactant and a β-naphthalene sulphonate-formaldehyde condensate (BNS). Very large amounts of surfactant solution are required in this case, presumably due to the lack of stability of the foamed solution.

The state of the art therefore constitutes a problem.

SHORT DESCRIPTION OF THE INVENTION

The present invention is defined in the appended claims.

In particular, the present invention is embodied by an aqueous composition for forming a foam, the composition comprising a surfactant and a particulate inorganic material, and optionally one or more polymers, such as soil conditioning polymers, and/or viscosity increasing polymers, and/or anti-settling agents. According to certain embodiments of the present invention, the surfactants in the aqueous composition are absorbed onto the particulate inorganic material. According to the present invention, it has been found that the foam stability is increased compared to prior art compositions. It is thought that the improved stability is caused by the presence of the particulate inorganic material.

According to one embodiment, the surfactant of the inventive composition may comprise one or more anionic surfactants, or one or more cationic surfactants, or one or more amphoteric surfactants, or one or more non-ionic surfactants, one or more fatty acid amines, or any combination thereof. Such surfactants are particularly useful in the application as tunnel drilling foams.

According to one embodiment, the surfactant is an anionic surfactant, such as for example a sodium salt of an ethoxylated $C_{12}$ to $C_{14}$-alcohol sulphate, such as for example sodium lauryl ether sulphate.

According to one embodiment, the surfactant is a cationic surfactant, such as for example an alkyl trimethyl ammonium halide such as tetradecyl trimethyl ammonium bromide or dicocodimethylammonium chloride, or dihydrogenated tallowoylethyl hydroxyethylmonium methosulfate, or a polymeric quaternary ammonium ester.

According to one embodiment, the particulate material is selected from the group consisting of perlite, bentonite, wollastonite, an alkaline earth metal carbonate or sulphate, such as calcium carbonate, for example, natural calcium carbonate and/or precipitated calcium carbonate, magnesium carbonate, dolomite, gypsum, aluminosilicate such as kaolin, talc, mica, diatomaceous earth, vermiculite, pumice, magnesium hydroxide, aluminium trihydrate, zinc oxide, and combinations thereof. It was found that these particulates were useful in improving the stability of the foam formed.

According to one embodiment, the inorganic particulate material is selected from the group consisting of talc, calcium carbonate, dolomite, zinc oxide, and kaolin. It was found that these particulates had good properties, while at the same time being readily available in required amounts and qualities. According to one embodiment, the inorganic particulate material is talc, such as for example microcrystalline talc, macrocrystalline talc, microlamellar talc or a mixture thereof.

According to one embodiment, the inorganic particulate material has a $d_{50}$ of 10 μm or lower, such as 5 μm or lower, such as ranging from 0.5 to 3.0 μm, such as about 1.0 μm, or about 2.0 μm, for example, it is a talc having a $d_{50}$ of 10 μm or lower, such as 5 μm or lower, such as ranging from 0.5 to 3.0 μm, such as about 1.0 μm, or about 2.0 μm. It was found that these particles had particularly advantageous properties.

According to one embodiment, the ratio of surfactant to water is in the range of 0.05 to 5 wt.-%. It was found that such levels of surfactant led to particularly stable foams.

According to one embodiment, the ratio of particulate inorganic powder to water is in the range of 1 to 60 wt.-%. It was found that such levels of particulate inorganic powder led to particularly stable foams, and that the level of surfactant used could be reduced at the same time.

According to one embodiment, the weight ratio of particulate inorganic powder to surfactant is in the range of 500:1 to 1:1. It was found that such levels of particulate inorganic powder led to particularly stable foams, and that the level of surfactant used could be reduced at the same time. According to some embodiments, the weight ratio of particulate inorganic powder to surfactant is in the range of 250:1 to 2:1, such as for example in the range of 150:1 to 5:1, such as for example about 100:1, or about 100:3, or about 30:1.

According to one embodiment of the present invention, the aqueous composition may comprise a contaminant, such as for example clay.

Also part of the present invention is the use of a particulate inorganic mineral in the preparation of a foam for tunnel excavation, or in other end use applications using aqueous foams, such as in the preparation of a foam for use in cosmetics. According to this embodiment, the particulate inorganic mineral may be defined as discussed according to the other embodiments of the invention, for example it may be selected from the group consisting of perlite, bentonite, wollastonite, an alkaline earth metal carbonate or sulphate, such as calcium carbonate, for example, natural calcium carbonate and/or precipitated calcium carbonate, magnesium carbonate, dolomite, gypsum, aluminosilicate such as kaolin, talc, mica, diatomaceous earth, vermiculite, pumice, magnesium hydroxide, aluminium trihydrate, zinc oxide, and combinations thereof.

Also part of the present invention is a method for the prevention of the clogging of a wide boring apparatus in tunnel boring by excavated spoil, comprising the use of an inorganic particulate material in an aqueous composition, for example for formation of an aqueous suspension or an aqueous foam. The said aqueous composition may be employed directly, without being foamed, or after formation of a foam. According to this embodiment, the particulate inorganic mineral may be defined as discussed according to the other embodiments of the invention, for example it may be selected from the group consisting of perlite, bentonite, wollastonite, an alkaline earth metal carbonate or sulphate, such as calcium carbonate, for example, natural calcium carbonate and/or precipitated calcium carbonate, magnesium carbonate, dolomite, gypsum, aluminosilicate such as kaolin, talc, mica, diatomaceous earth, vermiculite, pumice, magnesium hydroxide, aluminium trihydrate, zinc oxide, and combinations thereof.

Also part of the present invention is a method for preparing an aqueous composition according to the invention, comprising the steps of providing a surfactant, providing a particulate inorganic material, providing water, optionally, providing one or more polymers, such as soil conditioning polymers, and/or viscosity increasing polymers and/or anti-settling agents, and mixing the provided components in any order. According to this embodiment, the mixing may be carried out in any desired order. For example, the provided surfactant may be mixed into water first, and the particulate inorganic material admixed later. For example, the provided particulate inorganic material may be mixed into water first, and the surfactant admixed later. For example, the particulate inorganic material and the surfactant may be combined in a dry state and added into the water. For example, any of the optional components provided may be admixed at any stage, in a dry or wet or aqueous state.

Also part of the present invention is a method for stabilising an aqueous foam, comprising the steps of providing a surfactant, providing a particulate inorganic material, optionally, providing one or more polymers, such as soil conditioning polymers, and/or viscosity increasing polymers and/or anti-settling agents, and mixing the said components into an aqueous foam. The said provided components may be mixed into the foam in any order.

Also part of the present invention is the use of surfactant and particulate inorganic material for stabilising an aqueous foam.

Also part of the present invention is a composition comprising a surfactant and a particulate inorganic material, and optionally one or more polymers, such as soil conditioning polymers, and/or viscosity increasing polymers and/or anti-settling agents, wherein said composition comprises 5 wt.-% water or less, such as for example 3 wt.-% water or less, such as for example 1 wt.-% water or less, such as for example 0.5 wt.-% water or less, such as for example 0.3 wt.-% water or less, such as for example 0.1 wt.-% water or less. For example the composition may be essentially dry. According to one embodiment, the said dry composition may comprise talc as the particulate inorganic material and the surfactant is a cationic surfactant, such as tetradecyl trimethyl ammonium bromide or dicocodimethylammonium chloride.

It is understood that the following description concerns exemplary embodiments of the present invention and shall not be limiting the scope of the claims.

DETAILED DESCRIPTION OF THE INVENTION

The present invention according to the appended claims provides an aqueous composition for the formation of a foam, in particular a foam for use in tunnel excavation. Aqueous foams are used in tunnel excavation in clayey underground to help evacuate excavated spoil. It is thought that foams help prevent clay lumps from coming into contact with each other, and forming agglomerates that may clog the evacuation system.

According to the present invention, it was found that more stable foams can be formed by the addition of particulate inorganic materials to the aqueous foam forming compositions. In particular, it was found that the foams formed according to the present invention do not collapse as easily as state of the art foams, and maintain their foamy structure over a longer period of time. While in laboratory tests, state of the art foams were found to lose about 80% or more of their initial mass by water drainage within 10 minutes of formation, foams formed according to the present invention were found to maintain up to 90% of their initial mass after 60 minutes. These values were obtained by using the method as described in the Examples section of the present description.

Without intending to be bound by theory, it is thought that the particulate inorganic materials remain at the water-air interface of the foam bubbles to improve the foam stability. The ratio of surfactant to particulate inorganic material therefore needs to be balanced. When there is too much surfactant, it absorbs onto the inorganic particulate material and causes it to move into the water phase, away from the interface. In one particular embodiment, the surfactant is above the critical micelle concentration for good foam formation.

According to the present invention, the surfactants absorb onto the inorganic particulate materials in the aqueous composition. Such surfactants are also known as collectors. For example, a cationic surfactant may adhere to a negatively charged surface of an inorganic particle, such as talc.

According to the present invention, an aqueous composition for forming a foam is provided, the composition comprising a surfactant, a particulate inorganic material, and optionally one or more polymers, such as soil conditioning polymers, and/or viscosity increasing polymers. The said composition may be ready for foaming, or it may be a concentrate requiring dilution with additional water prior to foaming. The composition may also be a dry composition requiring the addition of water to form an aqueous composition that may be used in the formation or stabilisation of a foam.

Soil-Conditioning Polymer

Soil conditioning polymers are known in the art and are intended to prevent swelling of clays, when they are evacuated from the excavation site. They may be selected from polyacrylates or other polymers, in amounts known to the skilled person in the art. Typically, partially hydrolysed polyacrylamide polymers (PHPA) are employed, such as for example "Drillam MV" (provided by Lamberti SpA), as well as polyalkylene oxide polymers, such as for example "MasterRoc SLF P1" (provided by BASF).

Surfactants

Surfactants, or foaming agents, for example for use in foams for tunnel excavation are known in the art. In certain embodiments, the surfactant comprises or is one or more anionic surfactants, or one or more amphoteric surfactants, or one or more cationic surfactants, or one or more non-ionic surfactants, or combinations thereof.

Suitable anionic surfactants include, but are not limited to, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, potassium lauryl sulfate, sodium trideceth sulfate, sodium methyl lauroyl taurate, sodium lauroyl isethionate, sodium laureth sulfosuccinate, sodium lauroyl sulfosuccinate, sodium tridecyl benzene sulfonate, sodium dodecyl benzene sulfonate, sodium lauryl amphoacetate, sodium lauryl sulfoacetate, sodium cocoyl isethionate, sodium methyl cocoyl taurate and mixtures thereof. The anionic surfactant may be, for example, an aliphatic sulfonate, such as a primary $C_8$-$C_{22}$ alkane sulfonate, primary $C_8$-$C_{22}$ alkane disulfonate, $C_8$-$C_{22}$ alkene sulfonate, $C_8$-$C_{22}$ hydroxyalkane sulfonate or alkyl glyceryl ether sulfonate.

Suitable cationic surfactants include, but are not limited to, alkyl trimethyl ammonium halides, or dialkyl dimethyl ammonium halides, wherein the alkyl group may comprise from 8 to 24 carbon atoms, such as for example 10 or 12 or 14 or 16 or 18 or 20 or 22 carbon atoms, such as tetradecyltrimethylammonium bromide, or dicocodimethylammonium chloride. Other suitable cationic surfactants are quaternary ammonium species such as dihydrogenated tallowoylethyl hydroxyethylammonium methosulfate, or a polymeric quaternary ammonium esters as described in U.S. Pat. No. 8,936,159 B2, the contents of which are incorporated herein by reference. Without wanting to be bound by theory, it is thought that a cationic surfactant is likely to be acting more like a collector does in flotation systems. Thus, given the negative charge on the particle surfaces in near neutral pH conditions, a cationic surfactant is likely to more strongly adsorb onto the particles than the an anionic surfactant.

Suitable amphoteric surfactants include, but are not limited to, derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one substituent contains an anionic group, e.g., carboxy, sulfonate, sulfate, phosphate, or phosphonate. Illustrative amphoterics are coco dimethyl carboxymethyl betaine, cocoamidopropyl betaine, cocobetaine, oleyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, lauryl bis-(2-hydroxypropyl)alpha-carboxyethyl betaine, and mixtures thereof. The sulfobetaines may include stearyl dimethyl sulfopropyl betaine, lauryl dimethyl sulfoethyl betaine, lauryl bis-(2-hydroxyethyl) sulfopropyl betaine and mixtures thereof.

Suitable non-ionic surfactants include alcohols, acids, amides or alkyl phenols reacted with alkylene oxides, especially ethylene oxide either alone or with propylene oxide. Exemplary non-ionics are $C_6$-$C_{22}$ alkyl phenols-ethylene oxide condensates, the condensation products of $C_8$-$C_{18}$ aliphatic primary or secondary linear or branched alcohols with ethylene oxide, and products made by condensation of ethylene oxide with the reaction products of propylene oxide and ethylenediamine. Other non-ionics include long chain tertiary amine oxides. Other non-ionics are surfactants based on cocoamide and produced by reacting cocoamide with an alcohol amine, such as ethanolamine. Exemplary non-ionics include cocoamide MEA and cocoamide DEA. Other suitable non-ionics include alkyl polyglucosides such as decyl glucoside, lauryl glucoside and octyl glucoside.

In certain embodiments, the surfactant is a sodium lauryl sulphate (sodium dodecyl sulfate, SDS), or a sodium lauryl ether sulphate (SLES). In certain embodiments, the surfactant is tetradecyltrimethylammonium bromide (TTAB), or dicocodimethylammonium chloride.

The surfactant should be present in the aqueous composition according to one aspect of the present invention in an amount below or above the critical micelle concentration (CMC). CMC is defined as the concentration of surfactants above which micelles form and all additional surfactants added to the system go to micelles. If there is too much surfactant present in the composition, it may move the particulate inorganic material into the aqueous phase, preventing it from exercising its foam stabilising properties. The ratio of surfactant to inorganic particulate material therefore needs to be balanced. State of the art compositions may require a ratio of surfactant to water of up to 5.0 wt.-%.

In certain embodiments, the ratio of surfactant to water in the composition according to the invention is in the range of 0.01 to 5 wt.-%. For example, the ratio of surfactant to water in the composition may be in the range of 0.05 to 4 wt.-%, such as for example 0.1 to 3 wt.-%, such as for example about 0.05 wt.-%, about 0.3 wt.-%, about 0.5 wt.-%, about 1 wt.-%, about 2 wt.-%, about 3 wt.-%, about 4 wt.-%, or about 5 wt.-%.

Particulate Inorganic Material

According to the present invention, the stability of the foams formed from the inventive aqueous composition is improved by the presence of a particulate inorganic material.

Unless otherwise stated, particle size properties referred to herein for the inorganic particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The top cut particle size $d_{90}$ is the value determined in this way of the particle e.s.d at which there are 90% by weight of the particles which have an equivalent spherical diameter less than that $d_{90}$ value.

The particulate inorganic material shall have a particle size range that renders it suitable for foam formation, although the particle size range shall not be specifically limited. For example, the inorganic particulate material may have a mean particle size $d_{50}$ from about 0.01 µm to about 1 mm, provided that stable foams may be formed with such particulate material. For example, the particulate inorganic material may have a $d_{50}$ no greater than about 500 µm, for example no greater than about 250 µm, or no greater than about 100 µm, or no greater than about 50 µm. In certain embodiments, the inorganic particulate material has a $d_{50}$ of no greater than about 25 µm, for example, no greater than about 10 µm, or no greater than about 5 µm, or no greater than about 1 µm. In certain embodiments, the inorganic particulate material has a $d_{50}$ of from about 0.05 µm to about 5 µm, for example, or from about 0.1 µm to about 2.5 µm, or from about 0.5 µm to about 1 µm.

In certain embodiments, the particulate inorganic material may have a $d_{90}$ no greater than about 1 mm, for example no greater than about 500 µm, or no greater than about 400 µm, or no greater than about 300 µm, or no greater than about 200 µm, or no greater than about 100 µm. In certain embodiments, the inorganic particulate material has a $d_{90}$ of no greater than about 50 µm, for example, no greater than about 20 µm, or no greater than about 10 µm, or no greater than about 5 µm. In certain embodiments, the inorganic particulate material has a $d_{90}$ of from about 0.5 µm to about 10 µm, for example, or from about 1 µm to about 7.5 µm, or from about 2.5 µm to about 5 µm.

In certain embodiments, the inorganic particulate material is selected from the group consisting of perlite, bentonite, wollastonite, an alkaline earth metal carbonate or sulphate, such as calcium carbonate, for example, natural calcium carbonate and/or precipitated calcium carbonate, magnesium carbonate, dolomite, gypsum, aluminosilicate such as kaolin, talc, mica, diatomaceous earth, vermiculite, pumice, magnesium hydroxide, aluminium trihydrate, zinc oxide, and combinations thereof.

In certain embodiments, the inorganic particulate material is selected from the group consisting of talc, calcium carbonate, dolomite, kaolin, zinc oxide and combinations thereof.

In certain embodiments, the inorganic particulate material is talc, such as a macrocrystalline talc, or a microcrystalline talc, or a macrolamellar talc, or a combination thereof. The individual platelet size, i.e. the median diameter as measured by the Sedigraph method, of an individual talc platelet (a few thousand elementary sheets) can vary from approximately 1 µm to over 100 µm, depending on the conditions of formation of the deposit. The individual platelet size determines the lamellarity of the talc. A highly lamellar talc will have large individual platelets, whereas a microcrystalline talc will have small platelets. Although all talcs may be termed lamellar, their platelet size differs from one deposit to another. Small crystals provide a compact, dense ore, known as microcrystalline talc. Large crystals come in papery layers, known as macrocrystalline talc. Known microcrystalline talc deposits are located in Montana (Yellowstone) and in Australia (Three Springs). In a microcrystalline structure, talc elementary particles are composed of small plates compared to macrocrystalline structures, which are composed of larger plates.

According to certain embodiments, the inorganic particulate material is a microcrystalline talc having a $d_{90}$ of about 50 µm or less, such as for example 30 µm or less, such as for example 20 µm or less, such as for example 10 µm or less, such as for example about 5 µm, and a $d_{50}$ of about 20 µm or less, such as for example 10 µm or less, such as for example 5 µm or less, such as for example 3 µm or less, such as for example about 3 µm or about 1 µm.

As discussed above, the amounts of surfactant and inorganic particulate material need to be balanced, in order to avoid that the inorganic particulate material is moved into the aqueous phase by the surfactant, away from the water-air interface of the foam bubbles, preventing it from developing its foam stabilising properties.

According to certain embodiments, the ratio of particulate inorganic powder to water in the aqueous composition according to the present invention may be in the range of 1 to 60 wt.-%, such as for example in the range from 2 wt.-% to 50 wt.-%, or in the range from 3 wt.-% to 20 wt.-%, or in the range of 4 to 10 wt.-%, such as for example about 4 wt.-%, or about 5 wt.-%, or about 6 wt.-%, or about 8 wt.-%, or about 10 wt.-%, or about 12 wt.-%.

Further Components

Viscosity increasing polymers are known to the skilled person in the art. Anti-settling agents are known to the skilled person in the art. For example, attapulgite ("Attagel 40", BASF) may be employed.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

Foam Expansion Ratio (FER)

It was further found that the compositions according to the present invention had satisfactory to excellent foaming properties. Foam expansion ratios (FER) of close to 12.5 or more could be obtained with standard tap water, and even from 12.5 to nearly 18 with demineralised water.

EXAMPLES

Examples 1 to 4

Various inorganic particulate materials were tested for their foam stabilisation properties.

A number of inorganic particulate materials (10 wt.-%) were mixed into a 0.3 wt.-% foamed solution of sodium lauryl ether sulphate (MEYCO SLF 30, provided by BASF) in water, and the resulting compositions mixed using a laboratory foam generator. The resulting foams (60 g) were filled into a funnel cell with a frit and collector at the bottom, and left to stand. Any foam decomposition was measured by measuring the amount of water collected underneath the funnel cell.

The particulate inorganic materials tested are shown in Table I:

TABLE I

| Example | Mineral |
|---|---|
| 1 | $CaCO_3$ |
| 2 | Dolomite |
| 3 | Kaolin |
| 4 | Talc |
| Comp. | none |

The amount of water collected was observed for 30 minutes. The results are shown in Table II. The values shown are percentage values of foam remaining within the funnel cell, and can be seen as a measure of foam stability over time.

TABLE II

| | Time (min) | | | | | | | | | |
|---|---|---|---|---|---|---|---|---|---|---|
| | 0 | 1 | 2 | 3 | 4 | 5 | 7.5 | 10 | 15 | 30 |
| Comp. Ex. | 100 | 85 | 63 | 47 | 38 | 34 | 26 | 22 | 16 | 11 |
| Ex. 1 | 100 | 100 | 98 | 96 | 93 | 89 | 80 | 72 | 60 | 45 |
| Ex. 2 | 100 | 99 | 96 | 91 | 85 | 80 | 66 | 56 | 43 | 18 |
| Ex. 3 | 100 | 96 | 86 | 75 | 65 | 59 | 46 | 38 | 27 | 13 |
| Ex. 4 | 100 | 100 | 100 | 100 | 100 | 100 | 100 | 100 | 99 | 95 |

It was found that all inorganic particulate materials lead to improved foam stability. For Example 4 (talc), the stability after 60 minutes was 91%. The talc used in Example 4 is a microcrystalline talc having a $d_{90}$ of 5 µm and a $d_{50}$ of 1 µm.

Example 5

The talc from Example 4 was further tested in various surfactant concentrations. The test procedure was the same as in Examples 1 to 4, and the foaming agent employed again was sodium lauryl ether sulphate MEYCO SLF 30, provided by BASF) The varying test parameters are shown in Table III.

TABLE III

| Example | Parameters |
|---|---|
| Comp. 5a | 0.1 wt.-% SLES, no talc |
| Comp. 5b | 0.3 wt.-% SLES, no talc |
| Comp. 5c | 1.0 wt.-% SLES, no talc |
| Ex. 5a | 0.1 wt.-% SLES, 10 wt.-% talc |
| Ex. 5b | 0.3 wt.-% SLES, 10 wt.-% talc |
| Ex. 5c | 1.0 wt.-% SLES, 10 wt.-% talc |

The amount of water collected was observed for 30 minutes. The results are shown in Table IV. The values shown are percentage values of foam remaining within the funnel cell, and can be seen as a measure of foam stability over time.

TABLE IV

| | Time (min) | | | | | | | | | |
|---|---|---|---|---|---|---|---|---|---|---|
| | 0 | 1 | 2 | 3 | 4 | 5 | 7.5 | 10 | 15 | 30 |
| Comp. 5a | 100 | 86 | 64 | 48 | 39 | 34 | 26 | 19 | 14 | 7 |
| Comp. 5b | 100 | 85 | 63 | 47 | 38 | 34 | 26 | 22 | 16 | 11 |
| Comp. 5c | 100 | 83 | 64 | 49 | 37 | 34 | 27 | 23 | 16 | 11 |
| Ex. 5a | 100 | 92 | 87 | 83 | 80 | 78 | 73 | 70 | 66 | 62 |
| Ex. 5b | 100 | 100 | 100 | 100 | 100 | 100 | 100 | 100 | 99 | 95 |
| Ex. 5c | 100 | 95 | 82 | 70 | 59 | 49 | 35 | 28 | 20 | 12 |

It was found that the use of talc lead to improved foam stability, at whichever surfactant concentration. For Example 5c however (high surfactant concentration), the stability is only marginally higher than in the corresponding Comparative Example 5c. It is shown herewith that the requirement for surfactant use is reduced when talc is employed. Furthermore, the addition of excessive amounts of surfactant can reduce the stabilising effect of talc.

Examples 6 and 7

Foams were tested in the presence of various amounts of talc and tetradecyltrimethylammonium bromide (TTAB), using either demineralised water (Example 6) or standard tap water (Example 7). The talc used was a microcrystalline talc provided by Imerys Talc having a BET surface area of 21 $m^2/g$ (ISO 9277) and a median particle size of 1.1 µm (by Sedigraph—ISO13317-3). TTAB was used as a 5% aqueous stock solution. The foams were prepared by combining talc and TTAB stock solution and making up to 100 g using demineralised or tap water. The resulting compositions mixed using a laboratory foam generator. The resulting foams were filled into a funnel cell with a frit and collector at the bottom, and left to stand. Any foam decomposition was measured by measuring the amount of water collected underneath the funnel cell. The varying test parameters are shown in Table V.

TABLE V

| Example | Parameters |
|---|---|
| Ex. 6a | 0.05 wt.-% TTAB, 2.5 wt.-% talc |
| Ex. 6b | 0.05 wt.-% TTAB, 5 wt.-% talc |
| Ex. 6c | 0.10 wt.-% TTAB, 2.5 wt.-% talc |
| Ex. 6d | 0.10 wt.-% TTAB, 5 wt.-% talc |
| Ex. 6e | 0.15 wt.-% TTAB, 2.5 wt.-% talc |
| Ex. 6f | 0.15 wt.-% TTAB, 5 wt.-% talc |
| Ex. 7a | 0.05 wt.-% TTAB, 2.5 wt.-% talc |
| Ex. 7b | 0.05 wt.-% TTAB, 5 wt.-% talc |
| Ex. 7c | 0.10 wt.-% TTAB, 2.5 wt.-% talc |
| Ex. 7d | 0.10 wt.-% TTAB, 5 wt.-% talc |
| Ex. 7e | 0.15 wt.-% TTAB, 2.5 wt.-% talc |
| Ex. 7f | 0.15 wt.-% TTAB, 5 wt.-% talc |

The amount of water collected was observed for 30 minutes. The results are shown in Table VI. The values shown are percentage values of foam remaining within the funnel cell, and can be seen as a measure of foam stability over time. The values shown in the column "FER" indicate the obtained foam expansion ratios.

TABLE VI

| | Time (min) | | | | | | | |
|---|---|---|---|---|---|---|---|---|
| | 0 | 5 | 10 | 15 | 20 | 25 | 30 | FER |
| Ex. 6a | 100 | 79 | 72 | 67 | 66 | 65 | 64 | 10 |
| Ex. 6b | 100 | 82 | 76 | 73 | 70 | 69 | 68 | 17.7 |
| Ex. 6c | 100 | 90 | 78 | 69 | 63 | 59 | 56 | 3.5 |
| Ex. 6d | 100 | 91 | 83 | 78 | 76 | 73 | 71 | 8.7 |
| Ex. 6e | 100 | 88 | 69 | 55 | 44 | 36 | 31 | 2.9 |
| Ex. 6f | 100 | 100 | 96 | 87 | 81 | 75 | 70 | 4.3 |
| Ex. 7a | 100 | 70 | 62 | 58 | 56 | 54 | 53 | 6.2 |
| Ex. 7b | 100 | 77 | 71 | 67 | 66 | 64 | 63 | 12.3 |
| Ex. 7c | 100 | 89 | 74 | 63 | 55 | 49 | 46 | 2.4 |
| Ex. 7d | 100 | 91 | 82 | 76 | 73 | 70 | 68 | 5.3 |
| Ex. 7e | 100 | 94 | 77 | 58 | 48 | 41 | 38 | 1.7 |
| Ex. 7f | 100 | 99 | 95 | 86 | 80 | 75 | 71 | 3.0 |

It was found that all the Examples lead to improved foam stability over Comp. Ex. (see Table II above).

Example 8

The foam aqueous obtained in Example 6d above (comprising 0.10 wt.-% TTAB and 5 wt.-% talc) was mixed with clay. It was found that the foam stability was not substantially reduced by the addition of up to 65 wt.-% clay. This finding was supported by measurements of surface tension in foamed compositions including water, TTAB, talc and/or clay, as illustrated in Table VII. The increase in surface tension upon addition of clay may indicate that any residual foam not adsorbed on the talc is mopped up by the clay and desorbs from the air/water interface or bubble surface.

TABLE VII

| Foamed compostition | Surface tension |
| --- | --- |
| Water + TTAB (0.1 wt.-%) | 42.7 mN/m |
| Water + TTAB (0.1 wt.-%) + talc (3 wt.-%) | 52.1 mN/m |
| Water + TTAB (0.1 wt.-%) + talc (3 wt.-%) + clay (3 wt.-%) | 80.3 mN/m |

The invention claimed is:

1. An aqueous composition for forming a foam, the composition comprising a surfactant and a particulate inorganic material,
    wherein the surfactant absorbs onto the particulate inorganic material;
    wherein the particulate inorganic material is talc or a combination of talc and a particulate inorganic material selected from the group consisting of perlite, bentonite, wollastonite, an alkaline earth metal carbonate or sulphate, calcium carbonate, natural calcium carbonate, and/or precipitated calcium carbonate, magnesium carbonate, dolomite, gypsum, an aluminosilicate, kaolin, mica, diatomaceous earth, vermiculite, pumice, magnesium hydroxide, aluminium trihydrate, zinc oxide, and combinations thereof; and
    wherein the weight ratio of particulate inorganic powder to surfactant is in the range of 500:1 to 1:1.

2. An aqueous composition according to claim 1, wherein the surfactant comprises one or more anionic surfactants, or one or more cationic surfactants, or one or more amphoteric surfactants, or one or more non-ionic surfactants, one or more fatty acid amines, or any combination thereof.

3. An aqueous composition according to claim 2, wherein the surfactant comprises a sodium salt of an ethoxylated $C_{12}$ to $C_{14}$-alcohol sulphate.

4. An aqueous composition according to claim 2, wherein the surfactant comprises an alkyl trimethyl ammonium halide, tetradecyl trimethyl ammonium bromide, dicocodimethylammonium chloride, dihydrogenated tallowoylethyl hydroxyethylmonium methosulfate, or a polymeric quaternary ammonium ester.

5. An aqueous composition according to claim 1, wherein the talc comprises microcrystalline talc, macrocrystalline talc, microlamellar talc, or a mixture thereof.

6. An aqueous composition according to claim 1, wherein the talc is a microcrystalline talc having a $d_{50}$ of 10 μm or lower.

7. An aqueous composition according to claim 1, wherein the ratio of surfactant to water is in the range of 0.05 to 5 wt. %.

8. An aqueous composition according to claim 1, wherein a ratio of particulate inorganic powder to water is in the range of 1 to 60 wt. %.

9. An aqueous composition according to claim 1, wherein a weight ratio of particulate inorganic powder to surfactant is in the range of from 500:1 to 1:1.

10. An aqueous composition according to claim 1, wherein the particulate inorganic material is perlite or a mixture of perlite and talc.

11. An aqueous composition according to claim 1, wherein the composition further comprises a contaminant.

12. A method of preparing an aqueous composition according to claim 1, comprising the steps of
    providing a surfactant;
    providing a particulate inorganic material; and
    providing water; and
    mixing the provided components in any order.

13. An aqueous composition according to claim 1, wherein the composition comprises 5 wt.-% water or less.

14. An aqueous composition according to claim 13, wherein the particulate inorganic material is talc and the surfactant is a cationic surfactant, tetradecyl trimethyl ammonium bromide, or dicocodimethylammonium chloride.

15. An aqueous composition according to claim 3, wherein sodium salt of an ethoxylated $C_{12}$ to $C_{14}$-alcohol sulphate is sodium lauryl ether sulphate.

16. An aqueous composition according to claim 11, wherein the contaminant is a clay.

17. A method comprising:
    preparing an aqueous composition comprising a surfactant and a particulate inorganic material, wherein the surfactant absorbs onto the particulate inorganic material;
    using the aqueous composition to prepare a foam; and
    applying the foam during tunnel excavation
    wherein the surfactant absorbs onto the particulate inorganic material;
    wherein the particulate inorganic material is talc or a combination of talc and a particulate inorganic material selected from the group consisting of perlite, bentonite, wollastonite, an alkaline earth metal carbonate or sulphate, calcium carbonate, natural calcium carbonate, and/or precipitated calcium carbonate, magnesium carbonate, dolomite, gypsum, an aluminosilicate, kaolin, mica, diatomaceous earth, vermiculite, pumice, magnesium hydroxide, aluminium trihydrate, zinc oxide, and combinations thereof; and
    wherein the weight ratio of particulate inorganic powder to surfactant is in the range of 500:1 to 1:1.

18. The method of claim 17, wherein applying the foam during tunnel excavation prevents the clogging of a wide boring apparatus by excavated spoil.

19. A method of stabilizing an aqueous foam, comprising the steps of
    providing a surfactant,
    providing a particulate inorganic material,
    providing one or more soil conditioning polymers, viscosity increasing polymers, anti-settling agents, and
    mixing the components into an aqueous foam,
    wherein the surfactant absorbs onto the particulate inorganic material;
    wherein the particulate inorganic material is talc or a combination of talc and a particulate inorganic material selected from the group consisting of perlite, wollastonite, an alkaline earth metal carbonate or sulphate, calcium carbonate, natural calcium carbonate, and/or precipitated calcium carbonate, magnesium carbonate, dolomite, gypsum, an aluminosilicate, kaolin, mica, diatomaceous earth, vermiculite, pumice, magnesium hydroxide, aluminium trihydrate, zinc oxide, and combinations thereof; and wherein the weight ratio of particulate inorganic powder to surfactant is in the range of 500:1 to 1:1.

* * * * *